United States Patent
Di Cristofaro (10) Patent No.: US 9,531,204 B2
(45) Date of Patent: Dec. 27, 2016

(54) PORTABLE MODULAR POWER SYSTEM (71) Applicant: ECO-H TECHNOLOGIES INC., Hamilton (CA)

(72) Inventor: Vincenzo E. Di Cristofaro, Burlington (CA)

(73) Assignee: ECO-H TECHNOLOGIES INC., Hamilton (CA)

( * ) Notice: Subject to any disclaimer, the term of this patent is extended or adjusted under 35 U.S.C. 154(b) by 281 days.

(21) Appl. No.: 14/162,987

(22) Filed: Jan. 24, 2014

(65) Prior Publication Data

US 2014/0210401 A1 Jul. 31, 2014

Related U.S. Application Data (60) Provisional application No. 61/757,957, filed on Jan. 29, 2013.

(51) Int. Cl.
H02J 7/00 (2006.01)

(52) U.S. Cl.
CPC ............ *H02J 7/0022* (2013.01); *H02J 7/0024* (2013.01); *H02J 7/0068* (2013.01); *H02J 2007/0067* (2013.01)

(58) Field of Classification Search
CPC .............. H02J 9/02; H02J 9/065; H02J 7/025; H02J 7/00; H02J 7/0068; H02J 7/34; H02J 7/345; H02J 7/35; H02J 3/00; H02J 3/383; H02J 7/0027; H02J 7/0054; H02J 9/061; H02J 9/062; H02J 13/0075
USPC .................................................. 320/107–115
See application file for complete search history.

(56) References Cited

U.S. PATENT DOCUMENTS

| | | | |
|---|---|---|---|
| 7,633,248 B1 | 12/2009 | Williams | |
| 2011/0090726 A1* | 4/2011 | Brotto | H02J 7/0065 363/131 |
| 2012/0223524 A1 | 9/2012 | Williams | |
| 2012/0292992 A1 | 11/2012 | Williams | |
| 2013/0271083 A1 | 10/2013 | Williams | |
| 2013/0320919 A1* | 12/2013 | Adames | H02J 7/007 320/107 |
| 2014/0002010 A1* | 1/2014 | Paczkowski | H02J 7/0045 320/107 |

FOREIGN PATENT DOCUMENTS

WO WO 2011/126661 A2 10/2011

* cited by examiner

*Primary Examiner* — Binh Tat
(74) *Attorney, Agent, or Firm* — Conneely PC; Joseph Conneely (57) ABSTRACT

A portable modular power system, comprising: a first module having a first generator set coupled to a first battery charger, a first output of the first battery charger coupled to a first battery bank, the first battery bank coupled to a connection point; a second module having a second generator set coupled to a second battery charger, a second output of the second battery charger coupled to a second battery bank, the second battery bank coupled to the connection point; a circuit coupling the first and second outputs of the first and second battery chargers; and, a first control system located in the first module and communicatively coupled to components of the first and second modules for controlling the components.

34 Claims, 8 Drawing Sheets

PORTABLE MODULAR POWER SYSTEM

This application claims priority from U.S. Provisional Patent Application No. 61/757,957, filed Jan. 29, 2013, and incorporated herein by reference.

FIELD OF THE INVENTION

This invention relates to the field of portable power systems, and more specifically, to portable modular power systems.

BACKGROUND

The production of electric power in emergencies or in remote locations is a common problem. A portable electric generator may be used to produce electric power in emergencies or for delivering electric power to remote locations not served by the local electric utility.

One problem with portable electric generators relates to their capacity. In particular, while a single portable generator may be used to supply a load having a given demand, providing loads of higher demand with multiple portable generators can raise both technical and safety related problems.

A need therefore exists for an improved portable power system. Accordingly, a solution that addresses, at least in part, the above and other shortcomings is desired.

SUMMARY OF THE INVENTION

According to one aspect of the invention, there is provided a portable modular power system, comprising: a first module having a first generator set coupled to a first battery charger, a first output of the first battery charger coupled to a first battery bank, the first battery bank coupled to a connection point; a second module having a second generator set coupled to a second battery charger, a second output of the second battery charger coupled to a second battery bank, the second battery bank coupled to the connection point; a circuit coupling the first and second outputs of the first and second battery chargers; and, a first control system located in the first module and communicatively coupled to components of the first and second modules for controlling the components.

According to another aspect of the invention, there is provided a portable modular power system, comprising: a first module having a first generator set coupled to a first battery charger for charging a first battery bank coupled to a connection point; a second module having a second generator set coupled to a second battery charger for charging a second battery bank coupled to the connection point; a first control system in the first module for controlling operation of both the first and second modules; and, a circuit coupling the first and second battery chargers for enabling battery charger sharing between the first and second modules.

In accordance with further aspects of the invention, there is provided an apparatus such as a control system, a method for adapting same, as well as articles of manufacture such as a computer readable medium or product and computer program product or software product (e.g., comprising a non-transitory medium) having program instructions recorded thereon for practising the method of the invention.

BRIEF DESCRIPTION OF THE DRAWINGS

Features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the invention. In some instances, certain circuits, structures, software, techniques and methods have not been described or shown in detail in order not to obscure the invention. The term "control system" is used herein to refer to any machine for processing data, including the data processing systems, computer systems, and network arrangements described herein. Method related aspects of the present invention may be implemented in any computer programming language provided that the operating system of the control system provides the facilities that may support the requirements of the present invention. Any limitations presented would be a result of a particular type of operating system or computer programming language and would not be a limitation of the present invention. Method related aspects of the present invention may also be implemented in hardware or in a combination of hardware and software.

Figure 8:
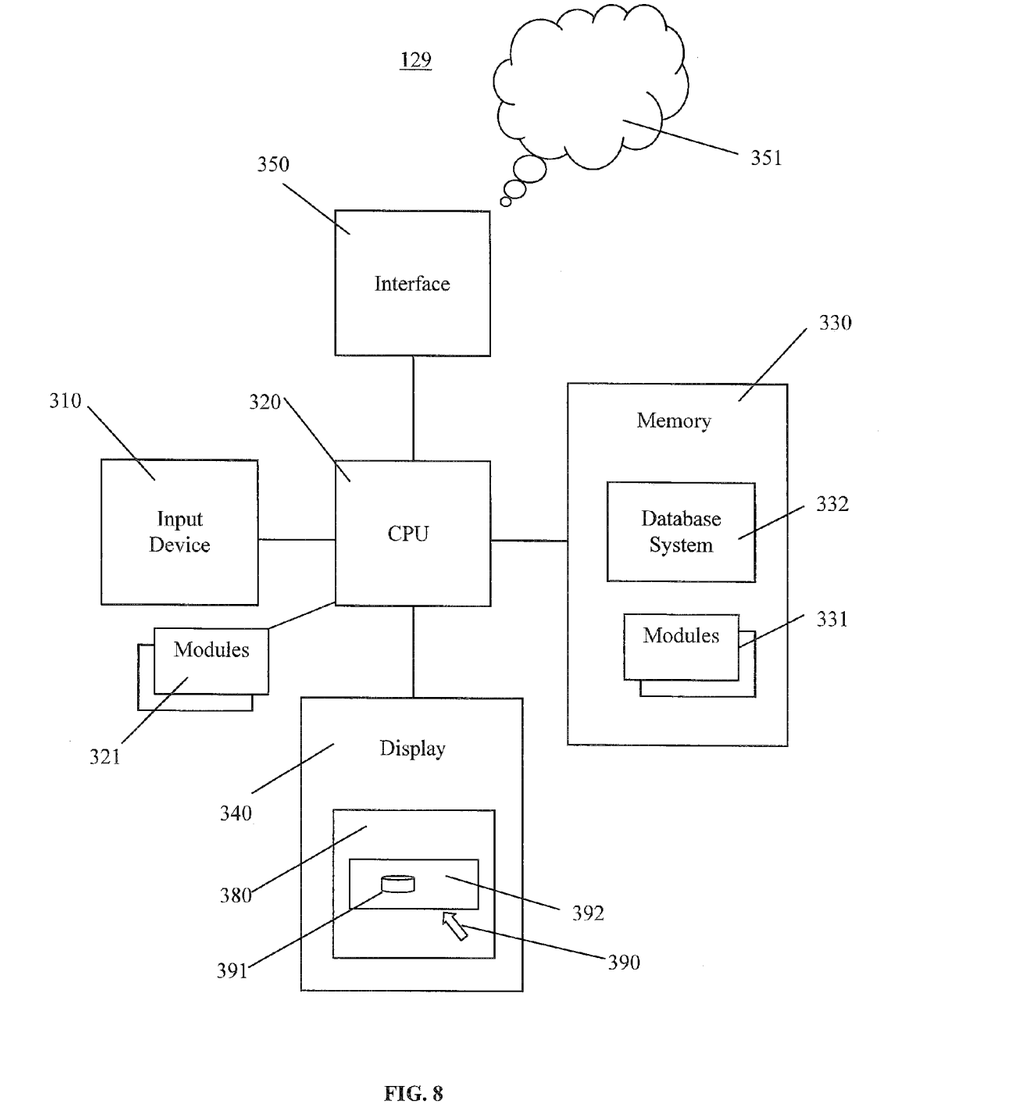

FIG. 8 is a block diagram illustrating a control system 129 in accordance with an embodiment of the invention. The control system 129 is suitable for controlling a portable modular power system 10 and for performing as a data processing system, programmable logic controller ("PLC"), or supervisory control and data acquisition ("SCADA") system. The control system 129 is also suitable for generating, displaying, and adjusting presentations in conjunction with a graphical user interface ("GUI") or Operator Interface Terminal ("OIT"), as described below. The control system 129 may be a client and/or server in a client/server system. For example, the control system 129 may be a server system or a personal computer ("PC") system. The control system 129 may also be a wireless device or other mobile, portable, or handheld device. The control system 129 may include an input device 310, a central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The control system 129 may be adapted for communicating with other data processing systems (e.g., similar to the control system 129) over a network 351 via the interface device 350. For example, the interface device 350 may include an interface to a network 351 such as the Internet and/or another wired (e.g., 125, 127) or wireless network (e.g., a wireless local area network ("WLAN"), a cellular telephone network, etc.). As such, the interface 350 may include suitable transmitters, receivers, antennae, etc. In addition, the control system 129 may include a Global Positioning System ("GPS") receiver. Thus, the control system 129 may be linked to other data processing systems (e.g., 129) by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 129. The CPU 320 may be operatively coupled to the input device 310 for receiving user commands or queries and for displaying the results of these commands or queries to the user on the display 340. Commands and queries may also be received via the interface device 350 and results may be transmitted via the interface device 350. The control system 129 may include a data store or database system 332 for storing data and programming information. The database system 332 may include a database management system (e.g., 332) and a database (e.g., 332) and may be stored in the memory 330 of the control system 129. In general, the control system 129 has stored therein data representing sequences of instructions which when executed cause the method described herein to be performed. Of course, the control system 129 may contain additional software and hardware a description of which is not necessary for understanding the invention.

Thus, the control system 129 includes computer executable programmed instructions for directing the system 129 to implement the embodiments of the present invention. The programmed instructions may be embodied in one or more hardware modules 321 or software modules 331 resident in the memory 330 of the control system 129 or elsewhere (e.g., 320). Alternatively, the programmed instructions may be embodied on a computer readable medium or product (e.g., a memory stick, a compact disk ("CD"), etc.) which may be used for transporting the programmed instructions to the memory 330 of the control system 129. Alternatively, the programmed instructions may be embedded in a computer-readable signal or signal-bearing medium or product that is uploaded to a network 351 by a vendor or supplier of the programmed instructions, and this signal or signal-bearing medium may be downloaded through an interface (e.g., 350) to the control system 129 from the network 351 by end users or potential buyers.

A user may interact with the control system 129 and its hardware and software modules 321, 331 using a user interface such as a graphical user interface ("GUI") or Operator Interface Terminal ("OIT") 380 (and related modules 321, 331). The OIT 380 may be used for monitoring, managing, and accessing the control system 129. OITs are supported by common operating systems and provide a display format which enables a user to choose commands, execute application programs, manage computer files, and perform other functions by selecting pictorial representations known as icons, or items from a menu through use of an input device 310 such as a mouse. In general, an OIT is used to convey information to and receive commands from users and generally includes a variety of OIT objects or controls, including icons, toolbars, drop-down menus, text, dialog boxes, buttons, and the like. A user typically interacts with an OIT 380 presented on a display 340 by using an input device (e.g., a mouse) 310 to position a pointer or cursor 390 over an object (e.g., an icon) 391 and by "clicking" on the object 391. Typically, an OIT based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 1:
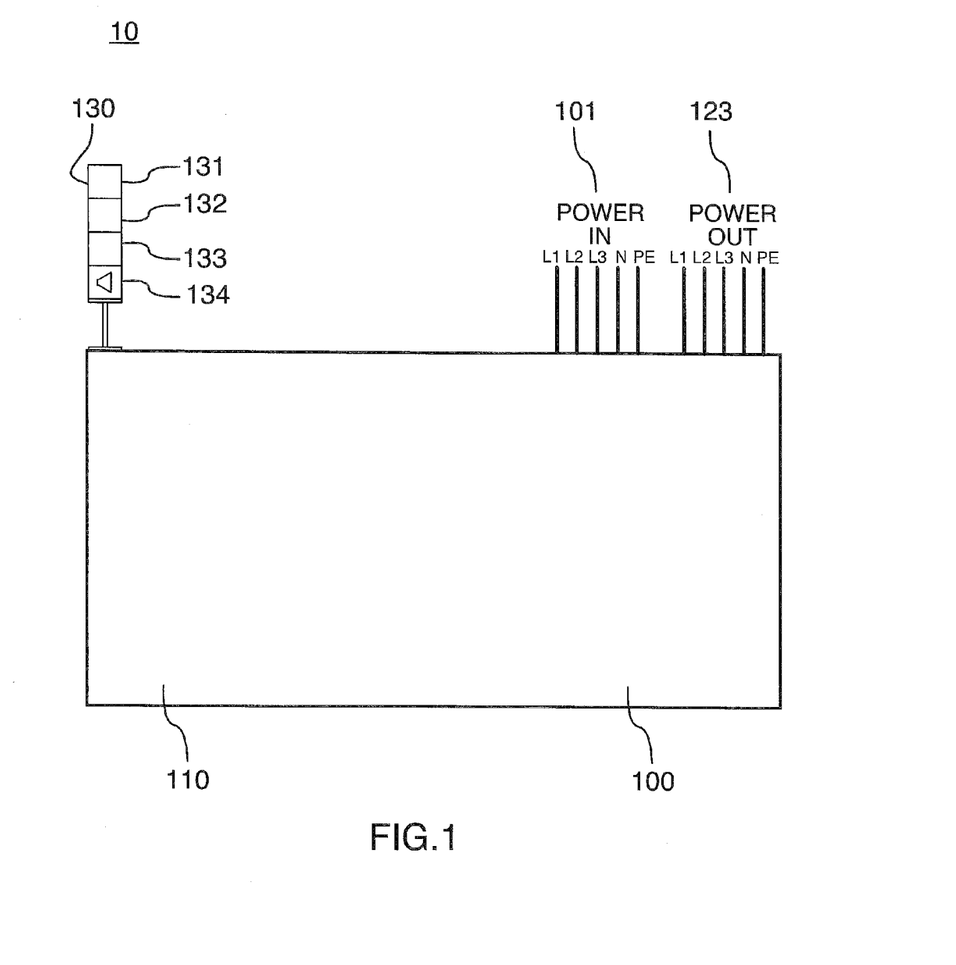
FIG. 1 is a block diagram illustrating a hub portable power system module in accordance with an embodiment of the invention.
Figure 2:
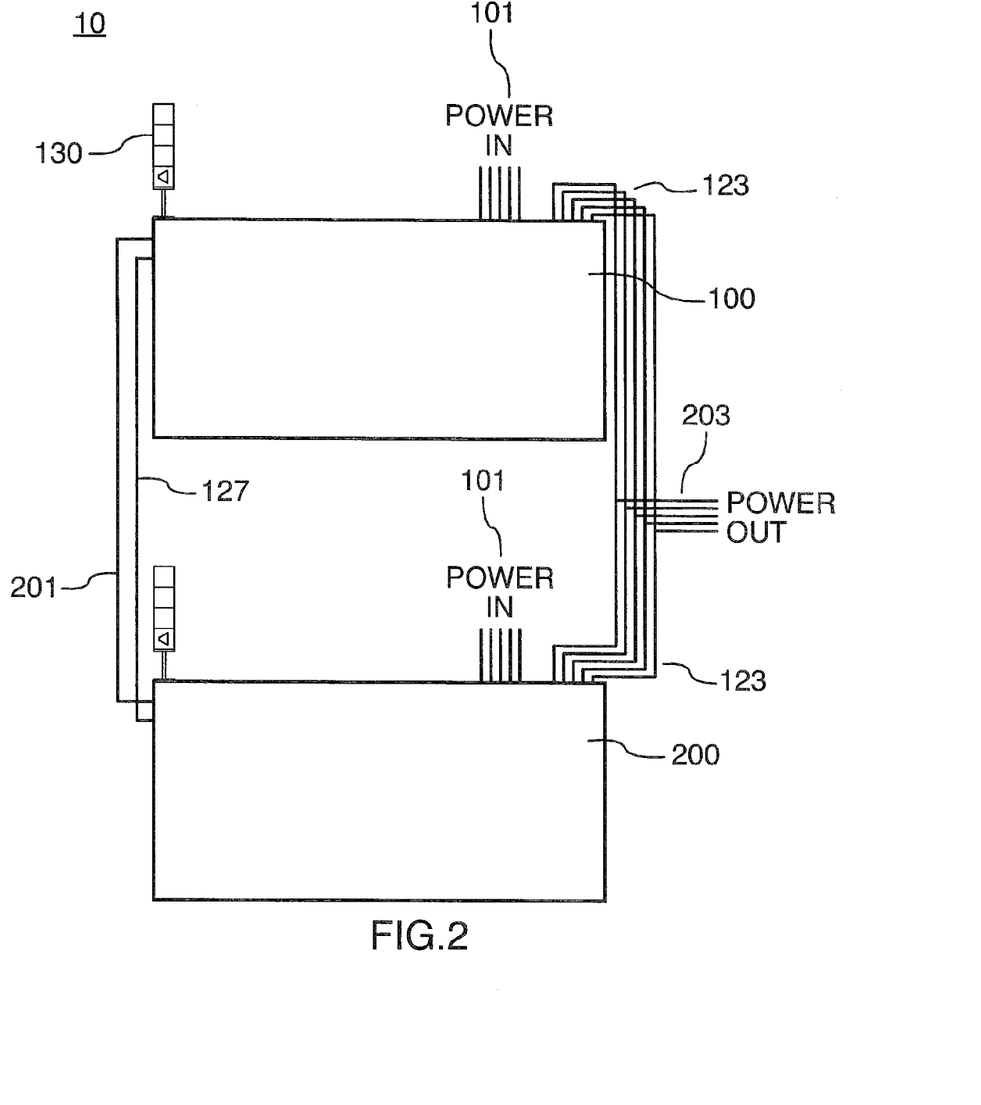
FIG. 2 is a block diagram illustrating the hub portable power system module of FIG. 1 coupled to a first spoke portable power system module to form a portable modular power system in accordance with an embodiment of the invention.
Figure 3:
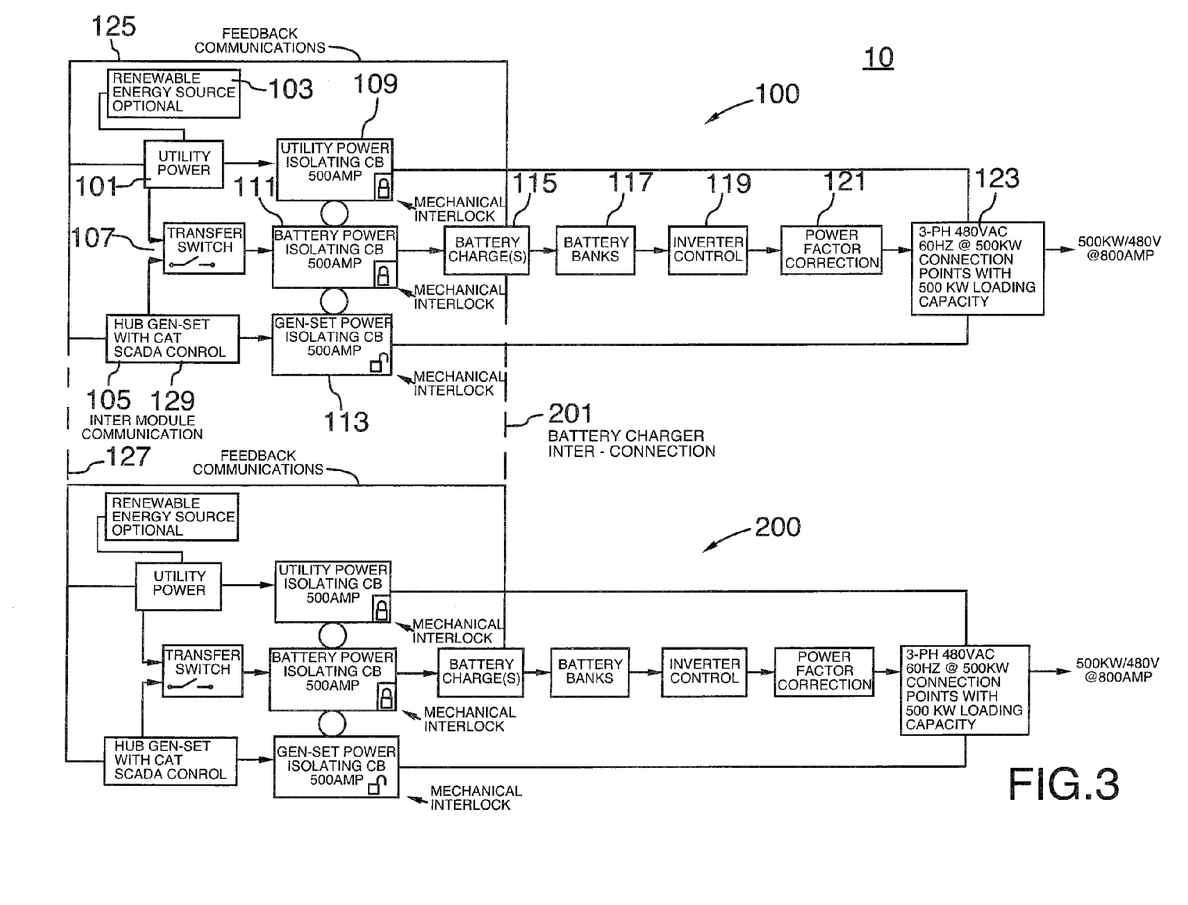
FIG. 3 is a schematic diagram illustrating the interconnection of the hub and spoke modules of the portable modular power system of FIG. 2 in accordance with an embodiment of the invention.
Figure 7:
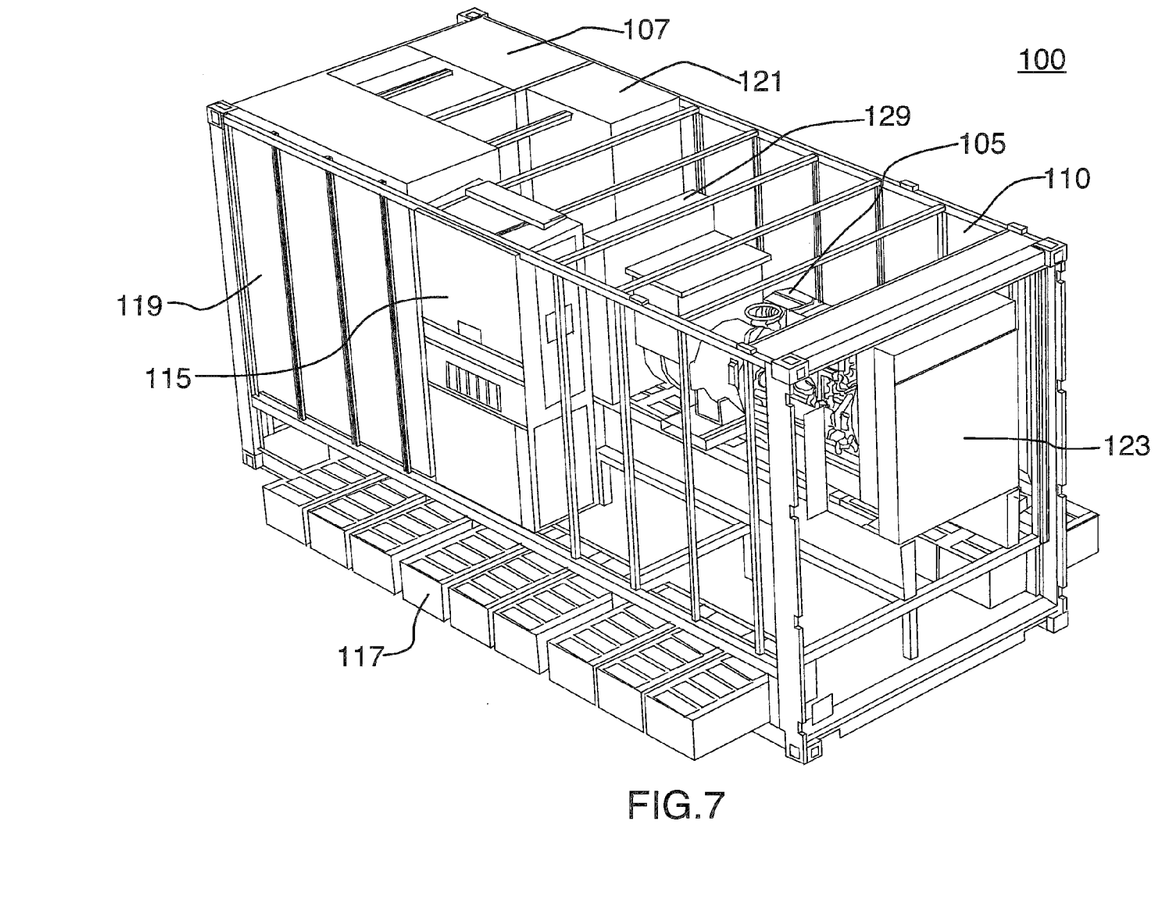
FIG. 7 is a cut-away perspective view illustrating the hub portable power system module of FIG. 1 in accordance with an embodiment of the invention; and, FIG. 8 is a block diagram illustrating a control system in accordance with an embodiment of the invention.

FIG. 1 is a block diagram illustrating a portable modular power system 10 having a hub portable power system module 100 in accordance with an embodiment of the invention. FIG. 2 is a block diagram illustrating a portable modular power system 10 having a hub portable power system module 100 coupled to a first spoke portable power system module 200 in accordance with an embodiment of the invention. FIG. 3 is a schematic diagram illustrating the interconnection of the hub and spoke modules 100, 200 of the portable modular power system 10 of FIG. 2 in accordance with an embodiment of the invention. And, FIG. 7 is a cut-away perspective view illustrating the hub portable power system module 100 of FIG. 1 in accordance with an embodiment of the invention.

According to one embodiment, the invention provides a portable modular power system 10 having a master or "hub" portable power system module 100 coupled to one or more slave or "spoke" portable power system modules 200. The portable modular power system 10 may consist of a single portable power system module 100 as shown in FIG. 1 or it may consist of multiple portable power system modules 100, 200 as shown in FIG. 2. If the portable modular power system 10 includes multiple portable power system modules, one of the modules is configured as the hub module 100 and the remaining modules are configured as spoke modules 200. According to one embodiment, each module 100, 200 may have a power output rating of 500 kW.

Referring to FIG. 3, each hub and spoke module 100, 200 includes: a generator set (or "gen-set") 105 for generating alternating current ("AC") power, a transfer switch 107 coupled to a battery power isolating circuit breaker ("CB") 111 for switching between an output of the gen-set 105 and an alternating current ("AC") utility (or line) power input 101 (which may optionally be supplied from a renewable energy source 103), one or more battery chargers 115 coupled to the output of the battery power isolating CB 111 for charging one or more batteries or battery banks 117 coupled thereto, an inverter 119 coupled to the battery banks 117 for generating AC power from direct current ("DC") power output from the battery banks 117, power factor correction equipment 121 coupled to the output of the inverter 119 for adjusting the power factor of the AC power output therefrom, and a connection point 123 coupled to the output of the power factor correction equipment 121 for providing output AC power from the module 100, 200.

A gen-set power isolating CB 113 is provided between an output of the gen-set 105 and the connection point 123 for connecting the output of the gen-set 105 directly to the connection point 123. Similarly, a utility power isolating CB 109 is provided between the utility power input 101 and the connection point 123 for connecting the utility power directly to the connection point 123.

The control system 129 is provided to control operation of the system 10 and to control and monitor the status of the components (e.g., 100, 200, 105, 107, 109, 111, 113, 115, 117, 119, 121, 125, 127, 130, 201, etc.) of the system 10 as described below. The control system 129 may include feedback communications circuits 125 between the one or more battery chargers 115, the utility power input 101, and the gen-set 105. In addition, the control system 129 may include inter-module communications circuits 127 between the hub and spoke modules 100, 200 and their components.

The control circuitry of the gen-set 105 of each module 100, 200 may be linked by the inter-module communications circuits 127 to the control system 129 for synchronizing the phase and frequency of the output of each gen-set 105 to facilitate their interconnection. The control system 129 may be housed with the gen-set 105 or it may be housed separately.

As shown in FIG. 2, a battery charger inter-connection circuit 201 is provided between the battery chargers 115 of each module 100, 200 to enable charge sharing between the modules 100, 200. The connection points 123 of each module 100, 200 are coupled to provide a combined output 203 for the system 10. In FIG. 2, according to one embodiment, the total power output of the system 10 is 1 MW being the sum of the 500 kW power outputs of each module 100, 200.

Figure 4:
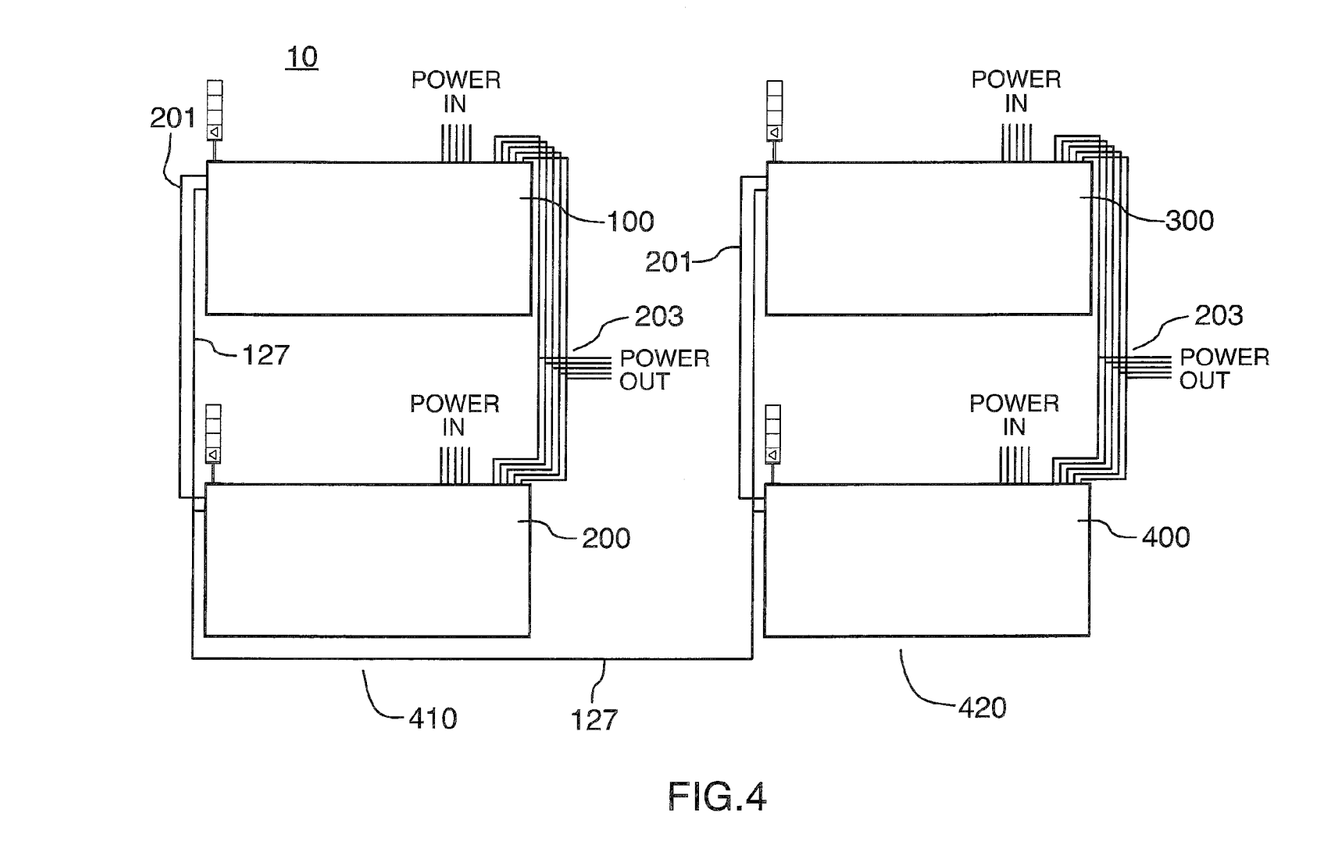
FIG. 4 is a block diagram illustrating a portable modular power system have a hub portable power system module coupled to first, second, and third spoke portable power system modules in accordance with an embodiment of the invention.
Figure 5:
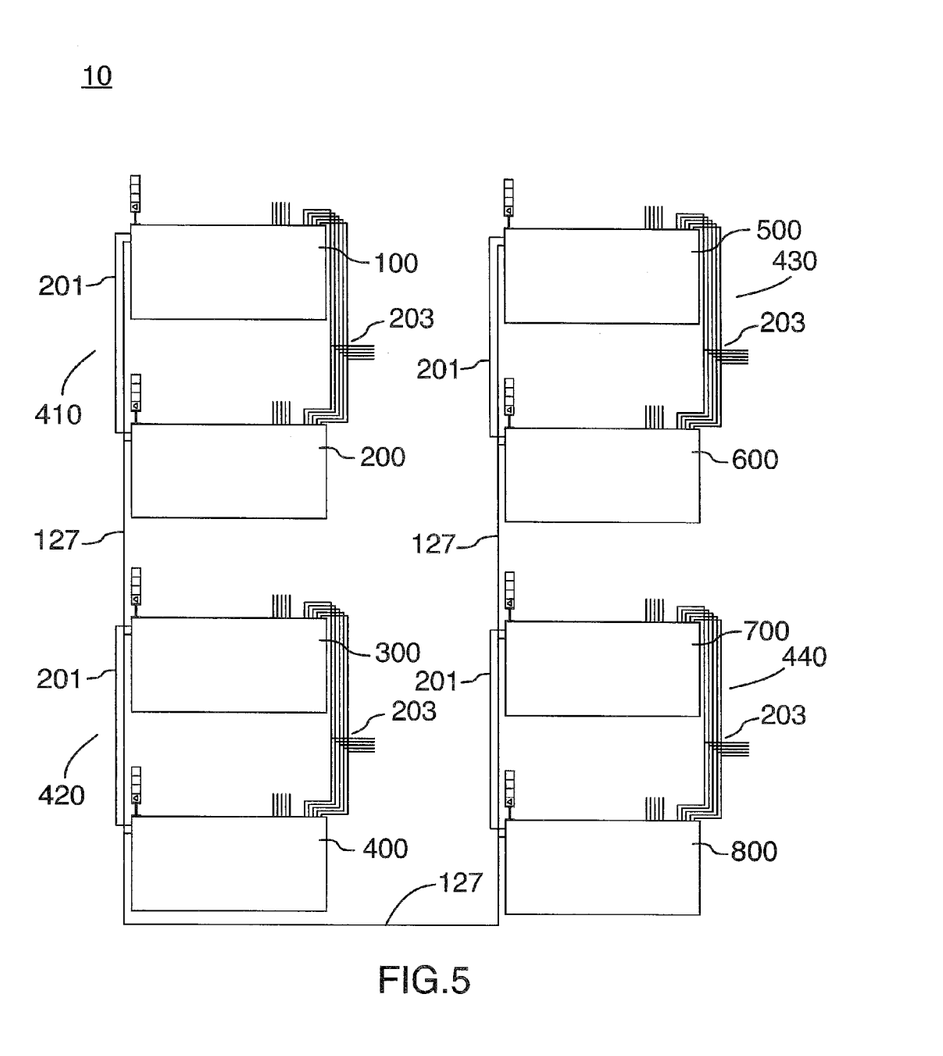
FIG. 5 is a block diagram illustrating a portable modular power system have a hub portable power system module coupled to first through seventh spoke portable power system modules in accordance with an embodiment of the invention.
Figure 6:
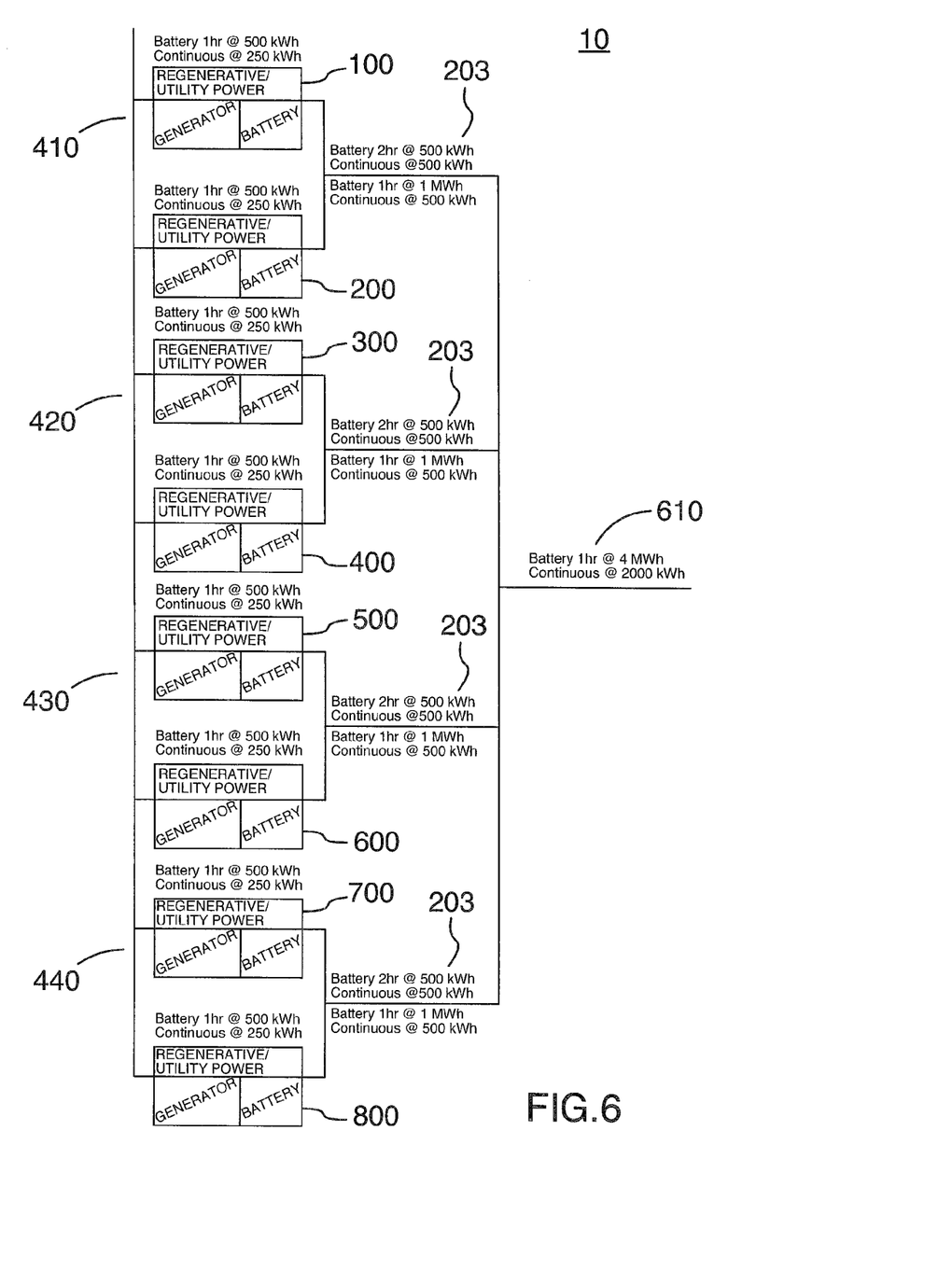
FIG. 6 is a schematic diagram illustrating the interconnection of the hub and spoke modules of the portable modular power system of FIG. 5 in accordance with an embodiment of the invention.

FIG. 4 is a block diagram illustrating a portable modular power system 10 have a hub portable power system module 100 coupled to first, second, and third spoke portable power system modules 200, 300, 400 in accordance with an embodiment of the invention. FIG. 5 is a block diagram illustrating a portable modular power system 10 have a hub portable power system module 100 coupled to first through seventh spoke portable power system modules 200, 300, 400, 500, 600, 700, 800 in accordance with an embodiment of the invention. And, FIG. 6 is a schematic diagram illustrating the interconnection of the hub and spoke modules 100, 200, 300, 400, 500, 600, 700, 800 of the portable modular power system 10 of FIG. 5 in accordance with an embodiment of the invention. According to one embodiment, the system 10 may include a maximum of eight modules 100, 200, 300, 400, 500, 600, 700, 800.

As shown in FIGS. 4 and 5, for a system 10 including more than two modules, the modules 100, 200, 300, 400, 500, 600, 700, 800 of the system 10 are connected in pairs 410, 420, 430, 440. For example, for the 2 MW system 10 shown in FIG. 4, two pairs 410, 420 of modules are used. The first pair 410 includes two modules 100, 200 and the second pair includes an additional two modules 300, 400. However, only one hub module 100 is included in the 2 MW system 10. The other modules 200, 300, 400 are configured as spoke modules. Similarly, for the 4 MW system 10 shown in FIG. 5, four pairs 410, 420, 430, 440 of modules are used. The first pair 410 includes two modules 100, 200, the second pair 420 includes an additional two modules 300, 400, the third pair 430 includes an additional two modules 500, 600, and the fourth pair 440 includes a final two modules 700, 800. Again, only one hub module 100 is included in the 4 MW system 10. The other modules 200, 300, 400, 500, 600, 700, 800 are configured as spoke modules.

As shown in FIGS. 4 and 5, according to one embodiment, a battery charger inter-connection circuit 201 is only provided between the battery chargers 115 of each module 100, 200 in a module pair 410. A battery charger inter-connection circuit 201 is not provided between module pairs 410, 420, 430, 440. However, note that inter-module communications circuits 127 are provided to couple each module 100, 200, 300, 400, 500, 600, 700, 800 in the system 10.

As shown in FIGS. 5 and 6, the outputs 203 of each module pair 410, 420, 430, 440 are coupled to provide a combined output 610 for the system 10. In FIG. 5, according to one embodiment, the total power output of the system 10 is 4 MW being the sum of the 1 MW power outputs of each module pair 410, 420, 430, 440.

Referring again to FIGS. 2 and 3, power is received at the utility power input 101 from the local utility and is generally connected to each module 100 via four individual phase connectors rated at the appropriate voltage and current (e.g., 480 VAC, etc.). With utility power present, the battery chargers 115 will charge battery banks 117 from this source and, according to one embodiment, the charging function will be controlled by the battery chargers 115. During times of low output demand, the battery chargers 115 in the hub module 100 may trickle charge (i.e., from utility power) both the battery banks 117 in the hub module 100 and the battery banks 117 in the spoke module 200 (i.e., if the output demand of the spoke module 200 is also sufficiently low).

The gen-set 105 of the hub module 100 is primarily used to generate electric power for the battery chargers 115 and is only run when battery capacity/reserve is sufficiently low that a "re-charge request" is issued to the battery chargers 115 from the control system 129. The gen-set 105 of the hub module 100 is electrically linked (via external cabling or circuits) to the gen-set 105 of one spoke module 200 with the following connections: i) utility power; ii) battery charger inter-connection circuit 201 cabling; iii) communications cabling 127; and, iv) control cabling 127 (dependent upon communication capacity and specific design control requirements).

The battery charger inter-connection circuit 201 cabling or circuit allows the gen-set 105 in the hub module 100 to divert charging power between itself and the spoke module 200 and vice-versa therefore reducing or eliminating the need for both the hub and spoke modules 100, 200 to operate together in times of low power demand. The hub module 100 may charge the battery banks 117 in the spoke module 200 and the spoke module 200 may be controlled to charge the battery banks 117 in the hub module 100.

An optional internal intelligence control panel ("ICP") (e.g., 129) on the gen-set 105 of the hub module 100 may communicate with up to seven gen-sets 105 of connected spoke modules 200, 300, 400, 500, 600, 700, 800. As mentioned above, the hub-plus-spoke module pair 410 and three spoke-plus-spoke module pairs 420, 430, 440 may provide a maximum capacity for up to 4 MW of electrical power (see FIG. 6). The hub module 100 may also command a spoke module (e.g., 300) to divert power to its partner (e.g., 400) in a module pair (e.g., 420) to allow for similar "charge-sharing" between a spoke-plus-spoke module pair 420 as between a hub-plus-spoke module pair 410.

The gen-set 105 of the spoke module 200 is also used primarily to generate electrical power for the battery charger 115 and only runs when battery capacity/reserve is sufficiently low that a "re-charge request" is issued by the control system 129 to the battery charger 115 and when the hub module 100 is not diverting charging current to the spoke module 200. In the event of maintenance of the battery chargers 115, battery banks 117, or other equipment in the system 10, an electrical power outlet (socket) rated at 480 VAC, 3-phase, 20 A, for example, may be provided directly from the gen-set 105. This is for the purpose of powering equipment needed to service the module 200 or its internal components.

The battery chargers 115 are connected together via a battery bank monitor ("BBM") (e.g., 129) coupled to the control system 129 and which controls charge to individual batteries 117 and battery banks 117. Both trickle charging and fast charging may be accommodated.

Electrical power received from the utility power input 101 (or generated from the gen-set 105 of the hub module 100 and/or the gen-set 105 of the spoke module 200) at 480 VAC is presented (via optional additional internal module equipment) to the battery chargers 115. The output of the battery banks 117 is DC power which is generally unsuitable for electrical distribution and requires conversion to AC power. The inverter 119 performs this task (with some electrical losses in conversion) ensuring that a controlled AC supply is provided to the power factor correction ("PFC") equipment or unit 121.

With respect to power factor correction (PFC), first note that there are primarily three types of electrical demand as follows: resistive, capacitive, and inductive. Resistive power is generally accepted as being not highly affected by PFC with exceptions only for high demand equipment/processes. Capacitive power may be disregarded as a concern due to the inherent nature of the majority of electrical equipment as not being designed to have a high capacitive load. Inductive loads however are highly susceptible to capacitance increase in electrical circuits and this effect may be used to reduce current draw for certain types of circuits and systems. Typical systems that are inherently inductive include copper coiled equipment such as motors, welders, transformers, etc. The PFC equipment 121 is capable of determining when inductance within a load is excessive and of balancing or compensating for this by automatically adding and/or removing PFC capacitor banks to the load.

With respect to electrical distribution, a 1 MW capacity bus-bar system (e.g., at connection point 123) is provided in each module 100, 200. Electrically coupling the hub module 100 and the spoke module 200 together combines the two 500 kW systems to provide a 1 MW output.

In operation, when utility power is active and stable it is directed from the utility power input 101 to the battery chargers 115 under control of the control system 29. The battery chargers 115 regulate the current charge to the battery banks 117 depending on discharge rate and electrical charge remaining within the battery banks 117. When the battery banks 117 are optimally charged (e.g., 95+%), the battery chargers 115 are isolated from the battery banks 117. This allows the batteries 117 to discharge as per their battery design and prevents continual charging. Output demand from a module 100, 200 is met by the stored and available power within the battery banks 117. When demand is such that the reserves of the battery banks 117 are below 60%, for example, utility power is redirected to the respective battery banks 117 via the battery chargers 115.

If there is no utility power available or utility power fails and when the reserves of the battery banks 117 are below 50%, for example, the gen-set 105 of the hub module 100 will engage and begin to re-charge the battery banks 117 via the battery chargers 115 under control of the control system 29. The gen-set 105 of the hub module 100 and the associated gen-set 105 of the spoke module 200 will alternate in battery charging under the conditions outlined above.

DC power output (e.g., up to 500 kW) from the battery banks 117 is delivered to the inverter 119 which converts it to AC power, continuously. The input voltage to the inverter 119 should remain constant with only available current capacity reducing with respect to demand. After inversion, AC power is presented to the power factor correction (PFC) equipment 121 and, dependent upon loading and demand, the PCF equipment 121 will internally and automatically engage banks of capacitors to limit output current draw/demand. Output power may be delivered from the connection point 123, for example, by way of a bank of five liquid-tight style connectors or protected terminal lugs (i.e., L1, L2, L3, N, and E).

The system 10 provides several levels of power redundancy. At a first level, the charge of the battery banks 117 relies on the availability of line or utility power for re-charging purposes. At a second level, when line or utility power fails, the charging of the battery banks 117 relies on power from the gen-set 105 of the hub module 100 for recharging purposes. At a third level, in the event of both line or utility power failure and inoperability of the gen-set 105 of the hub module 100, the battery banks 117 are charged from the gen-set 105 of the associated spoke module 200. At a fourth level, in the event of no available line or utility power at either module 100, 200 and with the gen-sets 105 of both modules 100, 200 in-operable, the capacity of battery banks 117 may be shared 201 between modules 100, 200 to offer prolonged power at either of the hub or spoke modules 100, 200. At a fifth level, if the spoke module 200 is powered from a different line or utility power source, the third level of redundancy allows for the battery banks 117 of the hub module 100 to be trickle charged from the battery banks 117 of the spoke module 200.

As shown in FIGS. 1, 2, and 7, the components (e.g., gen-set 105, battery banks 117, etc.) of each module 100, 200 may be mounted in a housing or container 110 for transport. The housing or container 110 may be sized for transport via truck or rail. A tower light warning system 130 may be mounted on the container 110. The warning system 130 may include a red lamp 131, an amber lamp 132, a green lamp 133, and an audible siren 134. Solid lighting of the green lamp 133 may indicate that line or utility power is available to the module 100, 200. Blinking of the green lamp 133 may indicate that there is a fault or failure with respect to the line or utility power. Solid lighting of the red lamp 131 may indicate that the gen-set 105 is running and/or charging the battery banks 117. Blinking of the red lamp 131 may indicate that there is a fault with the gen-set 105 or that attention is required. And, solid lighting of the amber light 132 may indicate that operator attention is required (e.g., low fuel, minor fault, etc.).

Thus, according to one embodiment, there is provided a portable modular power system 10, comprising: a first module 100 having a first generator set 105 coupled to a first battery charger 115, a first output of the first battery charger 115 coupled to a first battery bank 117, the first battery bank 117 coupled to a connection point 123; a second module 200 having a second generator set 105 coupled to a second battery charger 115, a second output of the second battery charger 115 coupled to a second battery bank 117, the second battery bank 117 coupled to the connection point 123; a circuit 201 coupling the first and second outputs of the first and second battery chargers 115; and, a first control system 29 located in the first module 100 and communicatively coupled to components (e.g., 100, 200, 105, 107, 109, 111, 113, 115, 117, 119, 121, 125, 127, 130, 201, etc.) of the first and second modules 100, 200 for controlling the components.

In the above portable modular power system 10, the control system 29 may control one of the first battery charger 15 and the second battery charger 15 to charge both of the first battery bank 117 and the second battery bank 117 via the circuit 201. The portable modular power system 10 may further include first and second selector switches 107 in the first and second modules 100, 200 selectively coupling one of first and second utility power inputs 101 and the first and second generator sets 105 to the first and second battery chargers 115, respectively. The control system 29 may control the first and second selector switches 107 to couple the first and second utility power inputs 101 to the first and second battery chargers 115, respectively. The control system 29 may control the first and second selector switches 107 to couple the first and second generator sets 105 to the first and second battery chargers 115, respectively. The first and second utility power inputs 101 may be coupled to the first and second battery chargers 115, respectively, when utility power is available. The first and second generator sets 105 may be coupled to the first and second battery chargers 115, respectively, when utility power is not available. The portable modular power system 10 may further include a second control system 29 located in the second module 200 and communicatively coupled to components of the second module 200, and the second control system 29 may operate under the control of the first control system 29 located in the first module 100. The portable modular power system 10 may further include a communication circuit 127 coupling the first and second modules 100, 200, the communication circuit 127 carrying control signals between the first and second modules 100, 200. The communication circuit 127 may communicatively couple the first and second control systems 29. The portable modular power system 10 may further include first and second inverters 119 coupled between the connection point 123 and the first and second battery banks 117 in the first and second modules 100, 200, respectively. The portable modular power system 10 may further include first and second power factor correction equipment 121 coupled between the connection point 123 and the first and second inverters 119 in the first and second modules 100, 200, respectively. The portable modular power system 10 may further include first and second containers 110 housing the first and second modules 100, 200, respectively. The first and second containers 110 may be transportable via at least one of truck, rail, and ship. The portable modular power system 10 may further include first and second warning systems 130 mounted on the first and second containers 110, respectively, the first and second warning systems 130 respectively indicating at least one of a fault and an operation of a component of one of the first and second modules 100, 200. And, the circuit 201 may allow at least one of the first and second battery chargers 115 to charge at least one of the first and second battery banks 117.

According to another embodiment, there is provided a portable modular power system 10, comprising: a first module 100 having a first generator set 105 coupled to a first battery charger 115 for charging a first battery bank 117 coupled to a connection point 123; a second module 200 having a second generator set 105 coupled to a second battery charger 115 for charging a second battery bank 117 coupled to the connection point 123; a first control system 129 in the first module 100 for controlling operation of both the first and second modules 100, 200; and, a circuit 201 coupling the first and second battery chargers 115 for enabling battery charger sharing between the first and second modules 100, 200.

The above portable modular power system 10 may further include first and second inverters 119 for producing alternating current power coupled between the connection point 123 and the first and second battery banks 117 in the first and second modules 100, 200, respectively. The portable modular power system 10 may further include first and second selector switches 107 in the first and second modules 100, 200 for selectively coupling one of first and second utility power inputs 101 and the first and second generator sets 105 to the first and second battery chargers 115, respectively. The portable modular power system 10 may further include a second control system 129 in the second module 200 for controlling operation of the second module 200, the second control system 129 operating under the control of the first control system 129 in the first module 100. And, the portable modular power system 10 may further include first and second containers 110 for housing the first and second modules 100, 200, respectively.

The above embodiments may contribute to an improved portable modular power system 10 and may provide one or more advantages. First, multiple modules 100, 200 may be used to provide scalable output. Second, the system 10 may be transported easily.

While aspects of this invention may be primarily discussed as a method, a person of ordinary skill in the art will understand that the apparatus discussed above with reference to a control system 129 may be programmed to enable the practice of the method of the invention. Moreover, an article of manufacture for use with a control system 129, such as a pre-recorded storage device or other similar computer readable medium or computer program product including program instructions recorded thereon, may direct the control system 129 to facilitate the practice of the method of the invention. It is understood that such apparatus, products, and articles of manufacture also come within the scope of the invention.

In particular, the sequences of instructions which when executed cause the method described herein to be performed by the control system 129 may be contained in a data carrier product according to one embodiment of the invention. This data carrier product may be loaded into and run by the control system 129. In addition, the sequences of instructions which when executed cause the method described herein to be performed by the control system 129 may be contained in a computer software product or computer program product (e.g., comprising a non-transitory medium) according to one embodiment of the invention. This computer software product or computer program product may be loaded into and run by the control system 129. Moreover, the sequences of instructions which when executed cause the method described herein to be performed by the control system 129 may be contained in an integrated circuit product (e.g., a hardware module or modules 321) which may include a coprocessor or memory according to one embodiment of the invention. This integrated circuit product may be installed in the control system 129.

The embodiments of the invention described above are intended to be exemplary only. Those skilled in this art will understand that various modifications of detail may be made to these embodiments, all of which come within the scope of the invention.

What is claimed is:

1. A portable modular power system, comprising:
   a first module having a first generator set coupled to a first battery charger, a first output of the first battery charger coupled to a first battery bank, the first battery bank coupled to a connection point;
   a second module having a second generator set coupled to a second battery charger, a second output of the second battery charger coupled to a second battery bank, the second battery bank coupled to the connection point;
   a circuit coupling the first and second outputs of the first and second battery chargers;
   a first control system located in the first module and communicatively coupled to components of the first and second modules for controlling the components; and,
   first and second containers separately housing the first and second modules, respectively, wherein the first and second containers are independently transportable.

2. The portable modular power system of claim 1 wherein the control system controls one of the first battery charger and the second battery charger to charge both of the first battery bank and the second battery bank via the circuit.

3. The portable modular power system of claim 1 and further comprising first and second selector switches in the first and second modules selectively coupling one of first and second utility power inputs and the first and second generator sets to the first and second battery chargers, respectively.

4. The portable modular power system of claim 3 wherein the control system controls the first and second selector switches to couple the first and second utility power inputs to the first and second battery chargers, respectively.

5. The portable modular power system of claim 3 wherein the control system controls the first and second selector switches to couple the first and second generator sets to the first and second battery chargers, respectively.

6. The portable modular power system of claim 4 wherein the first and second utility power inputs are coupled to the first and second battery chargers, respectively, when utility power is available.

7. The portable modular power system of claim 5 wherein the first and second generator sets are coupled to the first and second battery chargers, respectively, when utility power is not available.

8. The portable modular power system of claim 1 and further comprising a second control system located in the second module and communicatively coupled to components of the second module, wherein the second control system operates under the control of the first control system located in the first module.

9. The portable modular power system of claim 8 and further comprising a communication circuit coupling the first and second modules, the communication circuit carrying control signals between the first and second modules.

10. The portable modular power system of claim 9 wherein the communication circuit communicatively couples the first and second control systems.

11. The portable modular power system of claim 1 and further comprising first and second inverters coupled between the connection point and the first and second battery banks in the first and second modules, respectively.

12. The portable modular power system of claim 11 and further comprising first and second power factor correction equipment coupled between the connection point and the first and second inverters in the first and second modules, respectively.

13. The portable modular power system of claim 1 wherein the first and second containers are transportable via at least one of truck, rail, and ship.

14. The portable modular power system of claim 1 and further comprising first and second warning systems mounted on the first and second containers, respectively, the first and second warning systems respectively indicating at least one of a fault and an operation of a component of one of the first and second modules.

15. The portable modular power system of claim 1 wherein the circuit allows at least one of the first and second battery chargers to charge at least one of the first and second battery banks.

16. A method for providing electric power, comprising:
   coupling a first generator set to a first battery charger in a first module, a first output of the first battery charger coupled to a first battery bank, the first battery bank coupled to a connection point;
   coupling a second generator set to a second battery charger in a second module, a second output of the second battery charger coupled to a second battery bank, the second battery bank coupled to the connection point;
   coupling the first and second outputs of the first and second battery chargers with a circuit;
   controlling components of the first and second modules with a first control system located in the first module and communicatively coupled to the components to thereby output electric power from the connection point; and,
   separately housing the first and second modules in first and second containers, respectively, wherein the first and second containers are independently transportable.

17. The method of claim 16 wherein the control system controls one of the first battery charger and the second battery charger to charge both of the first battery bank and the second battery bank via the circuit.

18. The method of claim 16 and further comprising selectively coupling one of first and second utility power inputs and the first and second generator sets to the first and second battery chargers, respectively, using first and second selector switches in the first and second modules, respectively.

19. The method of claim 18 wherein the control system controls the first and second selector switches to couple the first and second utility power inputs to the first and second battery chargers, respectively.

20. The method of claim 19 wherein the control system controls the first and second selector switches to couple the first and second generator sets to the first and second battery chargers, respectively.

21. The method of claim 19 wherein the first and second utility power inputs are coupled to the first and second battery chargers, respectively, when utility power is available.

22. The method of claim 20 wherein the first and second generator sets are coupled to the first and second battery chargers, respectively, when utility power is not available.

23. The method of claim 16 wherein a second control system is located in the second module and is communicatively coupled to components of the second module and wherein the second control system operates under the control of the first control system located in the first module.

24. The method of claim 23 wherein a communication circuit couples the first and second modules, the communication circuit carrying control signals between the first and second modules.

25. The method of claim 24 wherein the communication circuit communicatively couples the first and second control systems.

26. The method of claim 16 wherein first and second inverters are coupled between the connection point and the first and second battery banks in the first and second modules, respectively.

27. The method of claim 26 wherein first and second power factor correction equipment are coupled between the connection point and the first and second inverters in the first and second modules, respectively.

28. The method of claim 16 wherein the first and second containers are transportable via at least one of truck, rail, and ship.

29. The method of claim 16 wherein first and second warning systems are mounted on the first and second containers, respectively, the first and second warning systems respectively indicating at least one of a fault and an operation of a component of one of the first and second modules.

30. The method of claim 16 wherein the circuit allows at least one of the first and second battery chargers to charge at least one of the first and second battery banks.

31. A portable modular power system, comprising:
a first module having a first generator set coupled to a first battery charger for charging a first battery bank coupled to a connection point;
a second module having a second generator set coupled to a second battery charger for charging a second battery bank coupled to the connection point;
a first control system in the first module for controlling operation of both the first and second modules;
a circuit coupling the first and second battery chargers for enabling battery charger sharing between the first and second modules; and,
first and second containers separately housing the first and second modules, respectively;
wherein the first and second containers are independently transportable.

32. The portable modular power system of claim 31 and further comprising first and second inverters for producing alternating current power coupled between the connection point and the first and second battery banks in the first and second modules, respectively.

33. The portable modular power system of claim 31 and further comprising first and second selector switches in the first and second modules for selectively coupling one of first and second utility power inputs and the first and second generator sets to the first and second battery chargers, respectively.

34. The portable modular power system of claim 31 and further comprising a second control system in the second module for controlling operation of the second module, the second control system operating under the control of the first control system in the first module.

* * * * *